United States Patent
Jager et al.

(10) Patent No.: US 10,391,828 B2
(45) Date of Patent: Aug. 27, 2019

(54) AXLE COMPONENT FOR A MOTOR VEHICLE AXLE

(71) Applicant: Benteler Automobiltechnik GmbH, Paderborn (DE)

(72) Inventors: Reinhard Jager, Paderborn (DE); Christian Smatloch, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 53 days.

(21) Appl. No.: 15/488,663

(22) Filed: Apr. 17, 2017

(65) Prior Publication Data
US 2017/0297398 A1    Oct. 19, 2017

(30) Foreign Application Priority Data
Apr. 18, 2016   (DE) .................. 10 2016 107 155

(51) Int. Cl.
| | | |
|---|---|---|
| B60G 7/02 | (2006.01) | |
| B60G 7/00 | (2006.01) | |
| B62D 21/15 | (2006.01) | |
| B62D 21/11 | (2006.01) | |
| F16F 1/38 | (2006.01) | |
| B62D 65/12 | (2006.01) | |

(52) U.S. Cl.
CPC .............. *B60G 7/02* (2013.01); *B60G 7/001* (2013.01); *B62D 21/11* (2013.01); *B62D 21/155* (2013.01); *F16F 1/38* (2013.01); *B60G 2204/15* (2013.01); *B62D 65/12* (2013.01)

(58) Field of Classification Search
CPC .. F16F 1/3849; F16F 1/3842; B60G 2204/15; B60G 7/001; B21D 26/033; B21D 53/90; B62D 21/155; B62D 65/12
See application file for complete search history.

(56) References Cited

U.S. PATENT DOCUMENTS

| | | | | |
|---|---|---|---|---|
| 3,481,622 A | * | 12/1969 | Haverbeck | B60G 7/00 |
| | | | | 280/124.109 |
| 4,456,282 A | * | 6/1984 | Rumpel | B60G 3/202 |
| | | | | 280/124.13 |
| 4,473,241 A | * | 9/1984 | von der Ohe | B60G 7/001 |
| | | | | 280/781 |
| 4,906,018 A | * | 3/1990 | Kijima | B60G 3/22 |
| | | | | 280/124.109 |
| 5,127,698 A | * | 7/1992 | Konig | B60G 99/004 |
| | | | | 248/635 |

(Continued)

FOREIGN PATENT DOCUMENTS

| | | |
|---|---|---|
| DE | 102006028713 B3 | 11/2007 |
| DE | 102010007944 A1 | 8/2011 |

OTHER PUBLICATIONS

Office Action for Chinese Application No. 201710250768.8 dated Feb. 3, 2019; 13pp.

*Primary Examiner* — Paul N Dickson
*Assistant Examiner* — Timothy Wilhelm
(74) *Attorney, Agent, or Firm* — Hauptman Ham, LLP

(57) ABSTRACT

An axle component for a motor vehicle axle is disclosed having rim holes for the insertion of a rubber-metal bearing. The upper and lower collars of the two rim holes are oriented in the same direction. An outwardly oriented collar is set back into the interior space in relation to an outer wall of the axle component.

16 Claims, 6 Drawing Sheets

(56) References Cited

U.S. PATENT DOCUMENTS

| | | | | |
|---|---|---|---|---|
| 5,567,005 | A * | 10/1996 | Kosuge | B62D 21/02 296/204 |
| 5,695,213 | A * | 12/1997 | Nakamura | B60G 3/06 280/124.134 |
| 5,862,877 | A * | 1/1999 | Horton | B60G 7/02 180/312 |
| 6,158,772 | A * | 12/2000 | Skudutis | B21D 26/033 180/311 |
| 6,442,820 | B1 * | 9/2002 | Mason | B21D 26/035 29/421.1 |
| 6,997,276 | B2 * | 2/2006 | Yoshida | B60G 99/00 180/232 |
| 7,445,243 | B2 * | 11/2008 | Park | B62D 21/11 280/124.109 |
| 7,503,197 | B2 * | 3/2009 | Ghiran | B21D 26/035 29/421.1 |
| 8,388,000 | B2 * | 3/2013 | Hessing | B21D 53/88 280/124.134 |
| 8,939,437 | B2 * | 1/2015 | Kobori | F16F 1/3735 267/140.3 |
| 9,010,716 | B2 * | 4/2015 | Kobori | F16F 1/3713 248/635 |
| 9,422,003 | B2 * | 8/2016 | Yun | B62D 21/11 |
| 9,512,893 | B2 * | 12/2016 | Yahata | F16F 1/3863 |
| 9,797,443 | B2 * | 10/2017 | Spinella | F16O 35/02 |
| 9,976,619 | B2 * | 5/2018 | Yahata | F16F 15/08 |
| 10,054,179 | B2 * | 8/2018 | Trotter | B60G 7/001 |
| 2002/0140146 | A1 * | 10/2002 | Nakagawa | F16F 1/3814 267/141.2 |
| 2006/0202400 | A1 * | 9/2006 | Fitzgerald | F16F 1/3732 267/293 |
| 2009/0277010 | A1 | 11/2009 | Runte et al. | |
| 2010/0124455 | A1 * | 5/2010 | Zaloga | B62D 7/16 403/144 |
| 2011/0198821 | A1 * | 8/2011 | Hessing | B21D 53/88 280/124.134 |
| 2012/0098178 | A1 * | 4/2012 | Yahata | F16F 1/3842 267/141.2 |
| 2017/0146087 | A1 * | 5/2017 | Koba | F16F 1/38 |

* cited by examiner

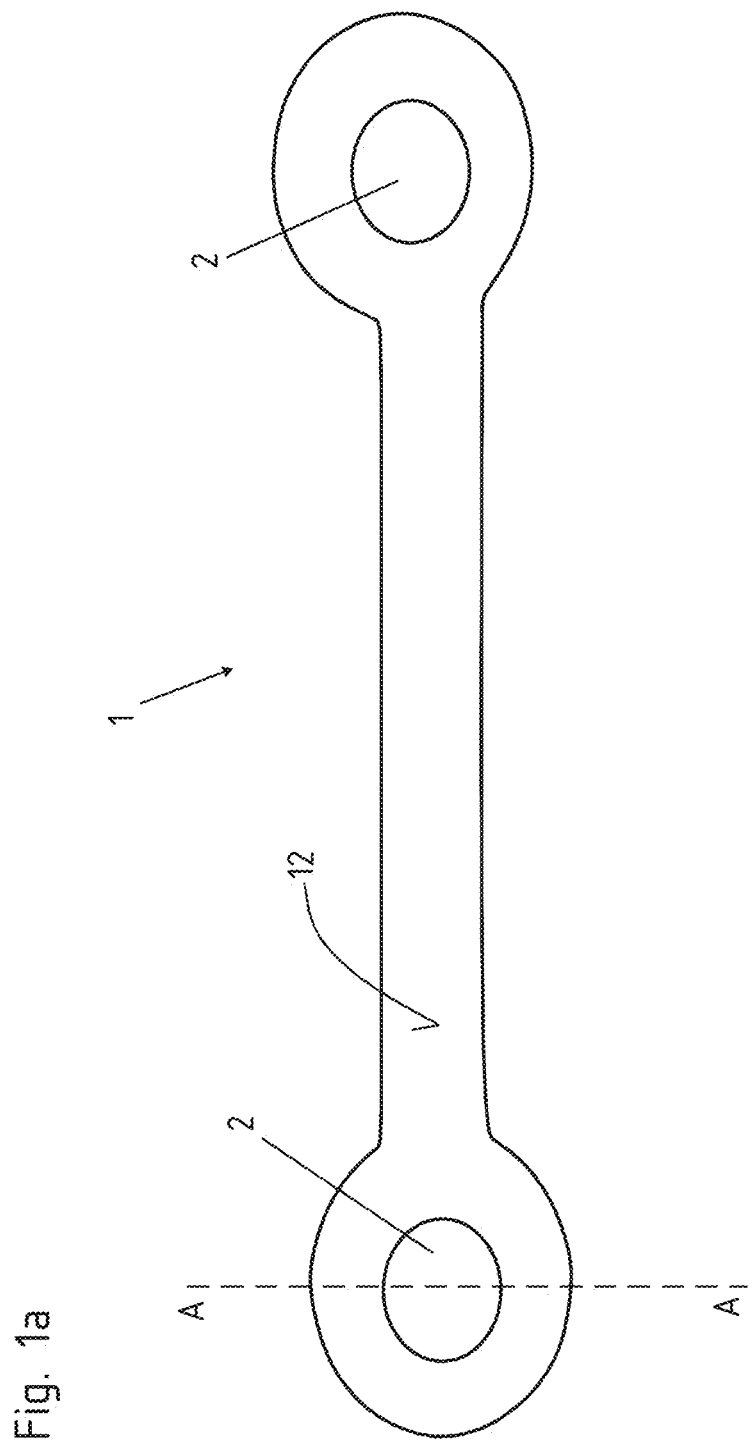

AXLE COMPONENT FOR A MOTOR VEHICLE AXLE

CROSS REFERENCE TO RELATED APPLICATIONS

The present application claims priority to German Application Number 10 2016 107 155.2 filed Apr. 18, 2016, the disclosure of which hereby is incorporated by reference herein in its entirety.

BACKGROUND OF THE INVENTION

1. Field of the Invention

The present invention relates to an axle component for a motor vehicle axle, and more specifically to a vehicle axle component having a rim hole for receiving a bearing.

2. Description of the Related Art

Prior art multi-link axles for motor vehicles are known having individual rod-shaped or curved links that are pivotally coupled to a vehicle body or to an axle auxiliary frame. On the opposite side in each case, the links are coupled to a wheel carrier, and therefore, in the event of an inward deflection and rebound of the wheel in relation to the motor vehicle body, guidance takes place on account of the links. In order to ensure the pivotability, but also to dampen the vibrations and impacts, rubber-metal bearings are inserted into the links. Such a link is known, for example, from DE 10 2006 028 713 B3. Bearing receptacles which are referred to as bearing eyes or else bearing openings are in each case formed. Rim holes are formed for the purposes of receiving, said rim holes pointing in opposed directions. A rubber-metal bearing with an outer bearing sleeve is then pressed into the collars of the rim holes.

Furthermore, a single-shell motor vehicle link is known from DE 10 2010 007 944 A1, wherein rim holes are produced in a manner oriented pointing in an opposed direction to one another.

A further variant embodiment makes provision for a receiving sleeve to be welded in and then the rubber-metal bearing to be pressed into the receiving sleeve itself. Rubber-metal bearings with an outer bearing sleeve and rubber-metal bearings which do not have an outer bearing sleeve can be inserted here.

However, a problem with collars oriented in opposed directions is that the bearing shell may tilt during the pressing-in operation. Furthermore, scuffing of the outer circumferential surface of the bearing shell may occur. This specifically impairs the quality of the fit of the bearing.

In the case of a welded-in sleeve, an increased outlay on manufacturing should be noted, because of the separate welding operation.

It is also known to insert rubber-metal bearings in the case of suspensions in the axle region, for example the suspension of an axle carrier. Said rubber-metal bearings in particular damp vibrations which occur, the vibrations occurring during driving and/or arising due to engine vibrations.

SUMMARY OF THE INVENTION

It is therefore the object of the present invention to provide a receptacle for a rubber-metal bearing in an axle component, wherein the receptacle overcomes the disadvantages known from the prior art.

The axle component according to the invention is designed for a motor vehicle axle, in particular for use on a multi-link axle. An axle component is preferably a link, in particular rod-type link or a curved link or an axle carrier. The axle component is designed as a hollow component. This means that it can be completely closed in cross section, but can also be designed as a hollow profile which is open in cross section. The axle component has at least one bearing receptacle, with two rim holes having a respective collar. The collars of the rim holes serve for receiving a rubber-metal bearing. In particular, the rubber-metal bearing is pressed into the bearing receptacle.

According to the invention, the collars of the rim hole are oriented pointing in the same direction. With respect to the hollow component, one collar is therefore oriented pointing into the interior space and the opposite collar is oriented pointing outward. However, the outwardly oriented collar is set back into the interior space of the axle component at least partially in relation to an outer wall of the link. The collars are spaced apart from one another.

According to the invention, one of the advantages is that a rubber-metal bearing being pressed in can be pressed without tilting into the bearing receptacle on account of the respective rounding of the rim hole. At the same time, the required construction space is not enlarged by the set-back outwardly oriented collar. The costs arising during the production process are approximately at the same level as two rim holes produced oriented inward.

The present invention also relates to an axle arrangement having the link according to the invention and at least one rubber-metal bearing pressed into the latter, or an axle carrier with a rubber-metal bearing pressed into it.

The axle component is preferably formed integrally and consistently in terms of material. This can either be produced as a formed component which is folded over. The axle component can also be formed from a hollow profile, for example by hydroforming. However it is also conceivable in the context of the invention that the axle component is formed in a shell-type construction. For example, two shells are joined to each other as a welded component. In the case of an axle carrier, the latter is preferably formed as a welded component from a plurality of the components mentioned above.

The axle arrangement itself can be formed from a steel alloy, in particular a hardenable steel alloy. However, the axle arrangement can be produced from a light metal alloy, in particular an aluminum alloy.

The outwardly oriented collar can be set back into the interior space at least partially, in particular completely, it is provided that a wave shape bordering the rim hole on the outside is produced. The rim hole is therefore set back into the interior space because of the wave shape, and therefore, although the collar is oriented outward, but is set back in particular at an outer end in relation to an outer wall of the link, it at least however ends flat with said outer wall. For this purpose, it can be provided in addition or alternatively that the outer border region surrounding the rim hole is drawn over into the interior space of the link.

The rubber-metal bearing, in particular an outer bearing sleeve of the rubber-metal bearing, can now be pressed in, it is provided that a rounded edge is formed on each rim hole in the transition region to the collar, wherein the two rounded edges are arranged oriented in a direction, in particular in the same direction, with respect to a pressing-in direction of the rubber-metal bearing. Centering can therefore take place when the outer bearing sleeve is respectively introduced into the rim hole. Tilting or else scuffing of the outer bearing sleeve is thereby avoided. In particular, single bonded bearings, consequently rubber-metal bearings without an outer bearing sleeve, can therefore also be pressed in. The outer circumferential surface of the outer elastomer layer is therefore not damaged during the pressing-in operation. The outer circumferential layer lies directly against the respective inner circumferential surface of the collars.

Furthermore, it is provided that the inside diameter of the collar itself is designed to be smaller than the outside diameter of the rubber-metal bearing being introduced. In particular, the inside diameter of the outwardly oriented collar which is set back into the interior space is designed to be smaller. Therefore, self-centering takes place during the pressing-in operation. Tilting is avoided because of the orientation according to the invention of the two collars in the same direction.

BRIEF DESCRIPTION OF THE DRAWINGS

The present invention will now be described, by way of example, with reference to the accompanying drawings, in which:

FIGS. 1a and 1b show a link as a rod-type link in a side view and an axle carrier in a perspective view;

In the figures, the same reference signs are used for identical or similar components even if a repeated description is omitted for reasons of simplicity.

DETAILED DESCRIPTION OF SOME EMBODIMENTS

Figure 1B:
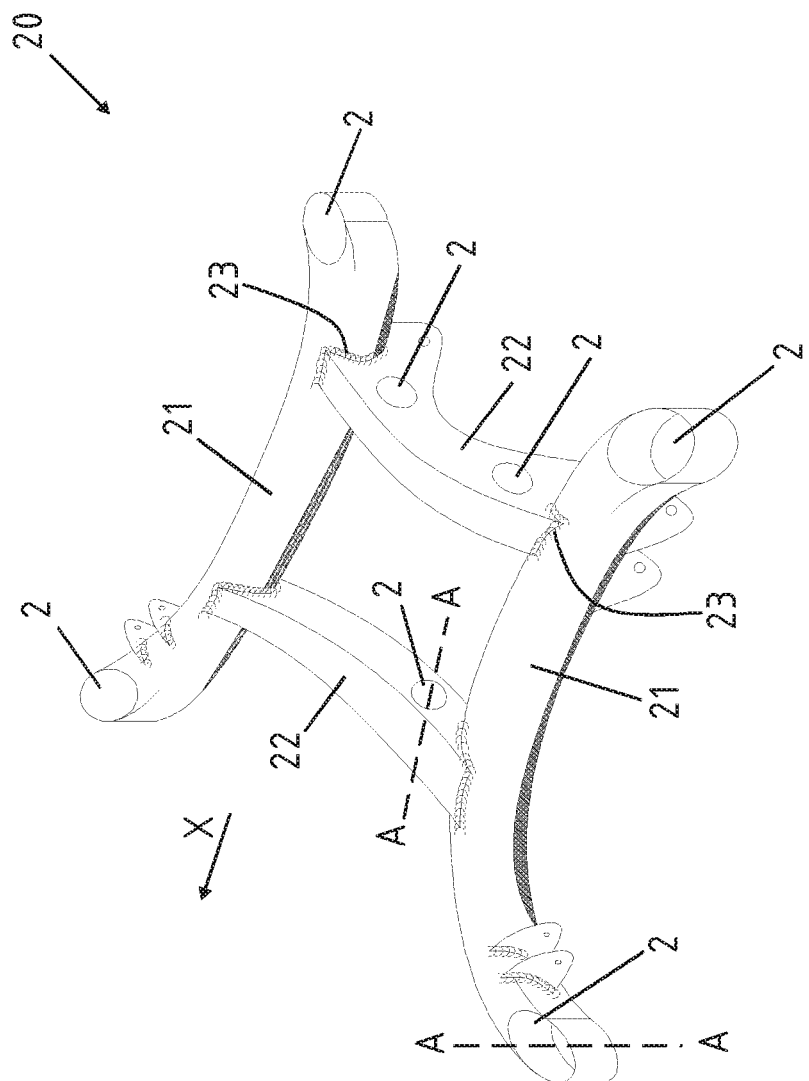

FIG. 1a shows a link 1 of the type in question in a rod-type form. The link 1 has an elongate extent and a respective bearing receptacle 2 at its respective ends for receiving a rubber-metal bearing (not illustrated specifically). FIG. 1b illustrates an axle carrier 20 of the type in question. The axle carrier has two longitudinal frame parts 21 each oriented laterally in the longitudinal direction X of the motor vehicle, and transverse bridges 22 connecting said longitudinal frame parts. The longitudinal frame parts 21 and transverse bridges 22 are coupled to one another in each case via weld seams 23. The longitudinal frame parts 21 and/or transverse bridges 22 can be produced as extruded profile or as formed sheet-metal components. In particular, however, they are produced as hollow components and have corresponding bearing receptacles for coupling to rubber-metal bearings (not illustrated specifically). FIGS. 2a and 2b, 3 and 4 each show a cross-sectional view according to the intersecting line A-A from FIGS. 1a and 1b.

Figure 2A:
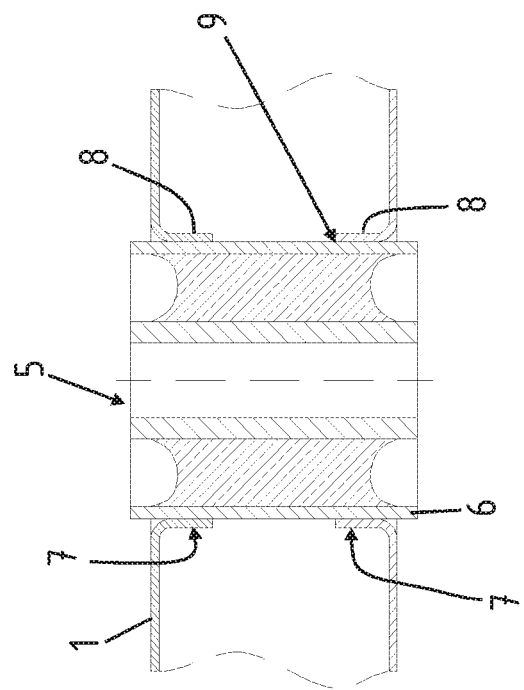
FIGS. 2a and 2b show a cross section according to intersecting line A-A and inserted bearing sleeve known from the prior art.
Figure 2B:
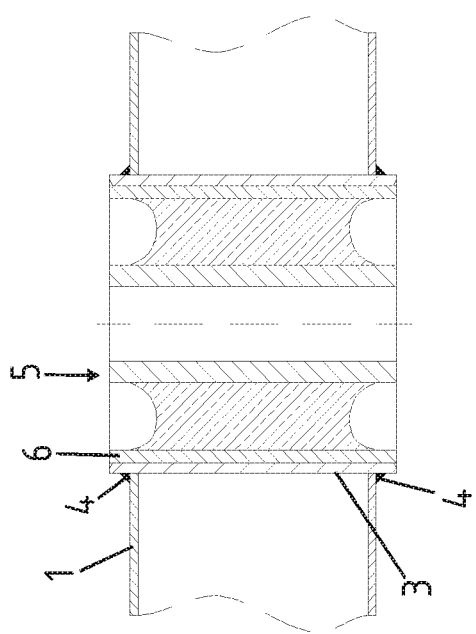

FIGS. 2a and 2b illustrate a variant embodiment, known in each case from the prior art, of a rubber-metal bearing 5 inserted into an axle component 1. FIG. 2a illustrates a receiving sleeve 3 with an encircling weld seam 4 in each case. A rubber-metal bearing 5 is pressed into the receiving sleeve 3 itself. The rubber-metal bearing 5 here has an outer bearing sleeve 6 which is pressed into the receiving sleeve 3.

FIG. 2b illustrates the axle component 1 with two rim holes 7 pointing toward each other. Each rim hole 7 has a collar 8, wherein the collars 8, 8.1 are oriented pointing toward each other. The outer bearing sleeve 6 of the rubber-metal bearing 5 is pressed into the rim holes 7. During the pressing-in operation which is undertaken from the top downward with respect to the plane of the image damage to or tilting of the bearing sleeve 6 may occur in the region of an edge 9.

Figure 3:
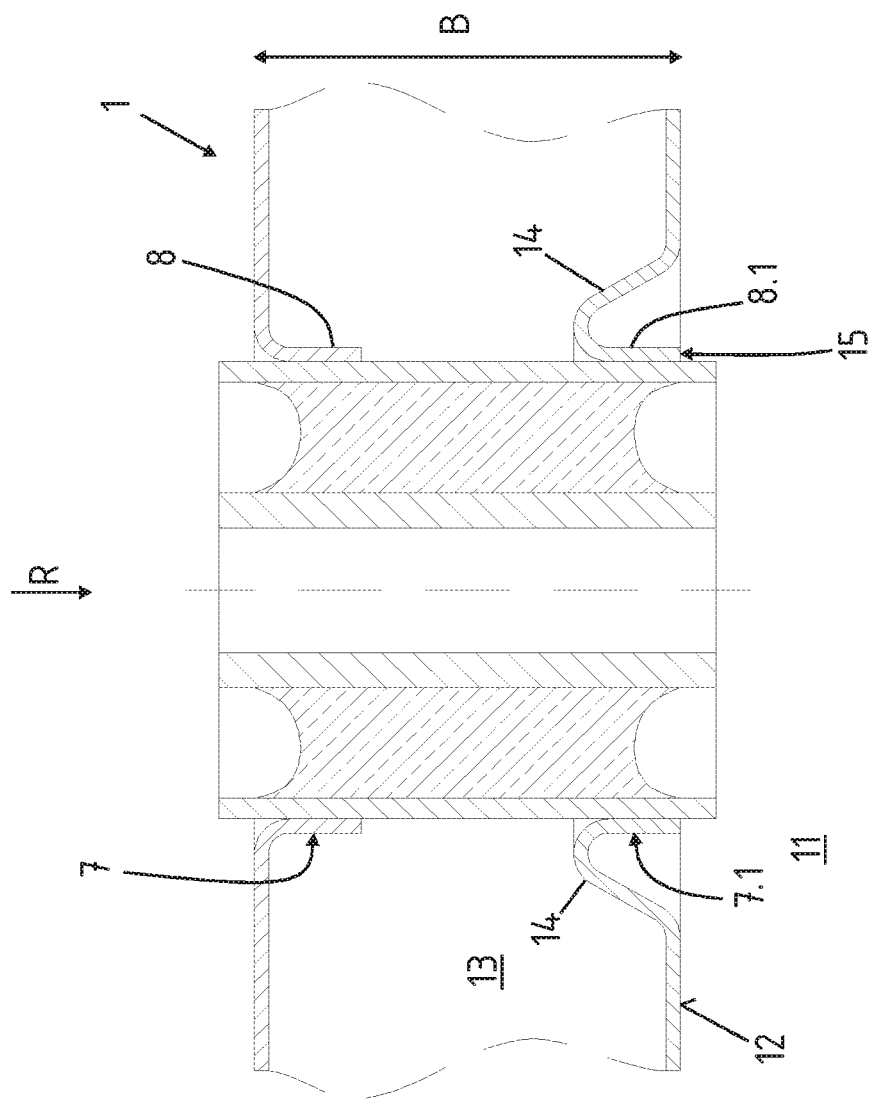
FIG. 3 shows a rubber-metal bearing inserted according to the invention according to intersecting line A-A.
Figure 4:
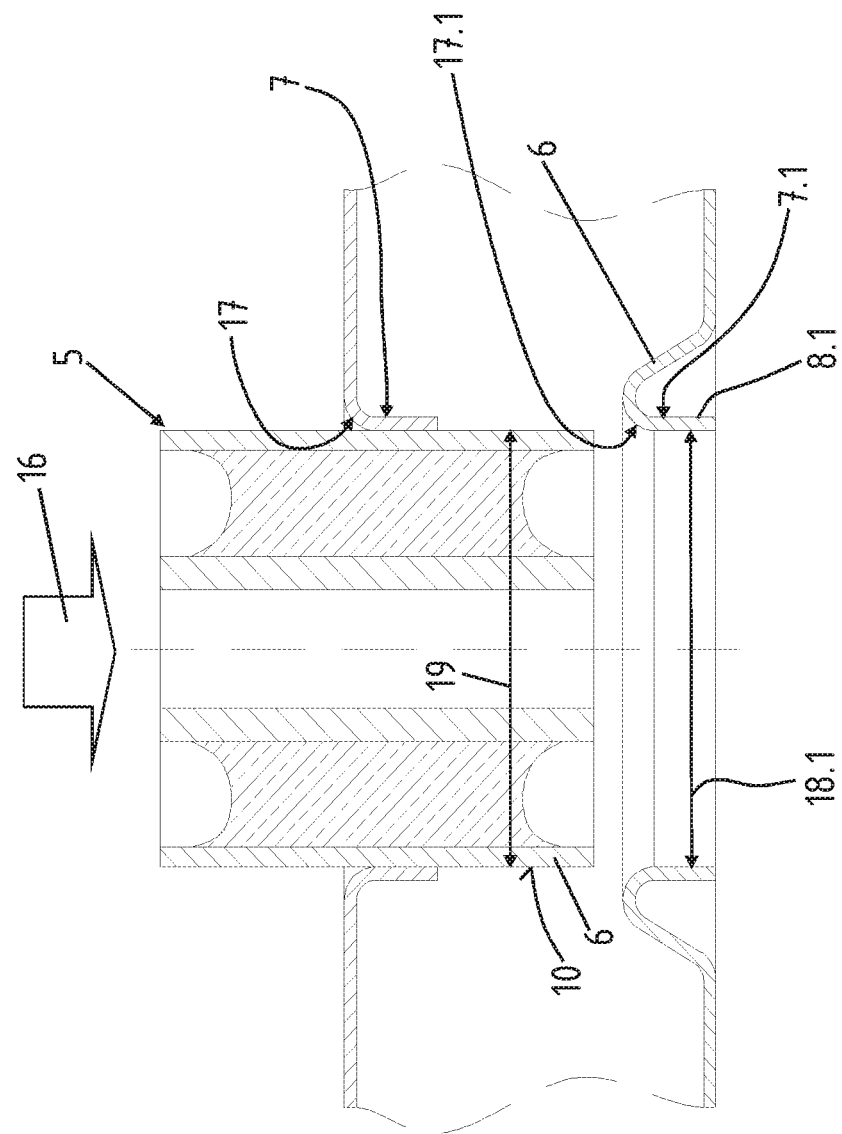
FIG. 4 shows a pressing-in operation according to the invention according to intersecting line A-A.

A first embodiment of the invention is illustrated in FIGS. 3 and 4. For this purpose, it is provided that the link 1 likewise has two rim holes 7, 7.1. However, the lower rim hole 7.1 with respect to the plane of the image has an outwardly 11 oriented collar 8.1 which is set back in relation to an outer wall 12 of the axle component 1 into an interior space 13. A wave shape 14 is formed which is drawn over inward such that an outer edge 15 ends flat with the outer wall 12 and/or is set back in relation thereto. The width B of the axle component 1 is therefore not increased. The two collars 8, 8.1 are oriented in the same direction R.

The further advantage according to the invention is illustrated in FIG. 4. In the pressing-in direction 16 of the rubber-metal bearing 5, a rounded edge 17 is therefore formed in the region of the upper rim hole 7 with respect to the plane of the image. However, a rounded edge 17.1 is also formed on the lower rim hole 7.1 with respect to the plane of the image. The outer circumferential surface 10 of the outer bearing sleeve 6 is therefore centered in each case because of the rounded edge 17, 17.1. An inside diameter 18.1 of the collar 8.1 is preferably designed to be smaller than or equal to an outside diameter 19 of the outer bearing sleeve 6.

Figure 5:
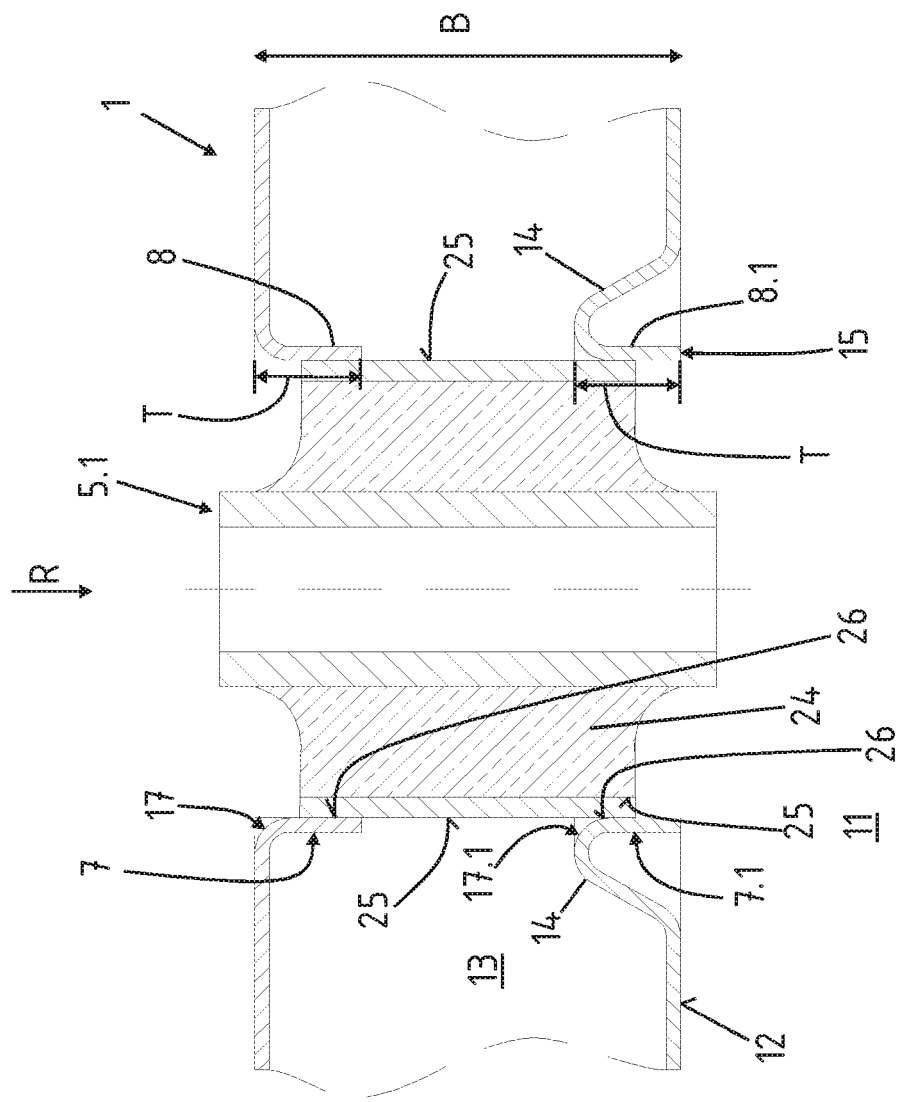
FIG. 5 a single bonded rubber-metal bearing inserted according to the invention according to intersecting line A-A.

FIG. 5 shows an alternative embodiment of the invention. A rubber-metal bearing as a single bonded bearing 5.1 is inserted here. The rubber layer or elastomer layer 24 therefore lies with its outer circumferential surface 25 directly against the inner circumferential surface 26 of the collars 8, 8.1. Damage to the elastomer material during the pressing-in operation is avoided by the identical orientation of the two collars 8, 8.1, in particular of the rounded edges 17, 17.1.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. An axle component for a motor vehicle axle, comprising:
   an upper wall and a lower wall forming a hollow interior space;
   at least one bearing receptacle formed by a pair of opposing rim holes through the upper and lower walls;
   each rim hole having a respective collar formed by an edge of the wall and to accommodate a rubber-metal bearing to be received therewithin;

wherein the collars of the rim holes are oriented in a same direction as an insertion direction of the rubber-metal bearing; and wherein the lower collar is oriented outward with respect to the interior space of the axle component and includes an inclined portion being partially set back into the interior space of the axle component in relation to an outer wall of the axle component.

2. The axle component as in claim 1, wherein said axle component is formed integrally of same material, and wherein said axle component is formed in a shell-type construction.

3. The axle component as in claim 2, wherein the material is a steel alloy or a light metal alloy.

4. The axle component as in claim 1, wherein the lower collar has a wave shape bordering the rim hole in the lower wall.

5. The axle component as in claim 1, wherein each collar of the rim holes includes a rounded edge oriented in the same direction as the insertion direction of the rubber-metal bearing.

6. The axle component as in claim 1, wherein an inside diameter of each collar of the rim holes is configured to be smaller than an outside diameter of the rubber-metal bearing.

7. The axle component as in claim 1, wherein said axle component has an open hollow profile in cross section.

8. The axle component as in claim 1, wherein the collars are spaced apart from each other.

9. The axle component as in claim 1, wherein said axle component is a link.

10. The axle component as in claim 1, wherein said at least one bearing receptacle is configured to receive at least one single bonded bearing or at least one rubber-metal bearing with an outer bearing sleeve.

11. The axle component as in claim 1, wherein the axle component is an axle carrier being a welded component.

12. The axle component as in claim 1, wherein an outer border region of the lower collar extends into the interior space.

13. The axle component as in claim 1, wherein said axle component has a closed hollow profile in cross section.

14. The axle component as in claim 1, wherein the lower collar includes a free end flushed with the lower wall.

15. An axle component for a motor vehicle axle, said axle component comprising:
    a first wall and a second wall defining therebetween an interior space of the axle component; and
    at least one bearing receptacle configured to accommodate a rubber-metal bearing inserted in an insertion direction therein, said at least one bearing receptacle including
        a first rim hole in the first wall,
        a second rim hole in the second wall, the second rim hole opposing to the first rim hole in the insertion direction,
        a first collar bordering the first rim hole, and extending in the insertion direction from an edge of the first rim hole into the interior space,
        an inclined portion extending from the second wall into the interior space toward the first collar, and
        a second collar bordering the second rim hole, and extending outwardly in the insertion direction from an end of the inclined portion inside the interior space.

16. The axle component as in claim 15, wherein the second collar includes
    one end connected to the end of the inclined portion inside the interior space, and
    another end opposite to the one end and flushed with an outer surface of the second wall.

* * * * *